(12) United States Patent
Demski et al.

(10) Patent No.: US 11,299,085 B2
(45) Date of Patent: Apr. 12, 2022

(54) LOW BEAM AND WORK LIGHT CONTROL FOR A WORK VEHICLE

(71) Applicant: DEERE & COMPANY, Moline, IL (US)

(72) Inventors: Nathan R. Demski, Durango, IA (US); Brian T. Mosdal, Polk City, IA (US); Matthew Lommen, Bettendorf, IA (US); Michael R. Gratton, Asbury, IA (US); Christopher J. Mahoney, Bettendorf, IA (US); Nathan D. Turnis, Bettendorf, IA (US); Keith C. Rottinghaus, Davenport, IA (US); Brian Huenink, Cedar Grove, WI (US); Nathan D. Sherman, Moline, IL (US)

(73) Assignee: Deere & Company, Moline, IL (US)

( * ) Notice: Subject to any disclaimer, the term of this patent is extended or adjusted under 35 U.S.C. 154(b) by 147 days.

(21) Appl. No.: 15/931,731

(22) Filed: May 14, 2020

(65) Prior Publication Data
US 2021/0354618 A1 Nov. 18, 2021

(51) Int. Cl.
*B60Q 1/06* (2006.01)
*B60Q 1/04* (2006.01)
*G01S 19/42* (2010.01)
*B62D 33/06* (2006.01)

(52) U.S. Cl.
CPC ............. *B60Q 1/045* (2013.01); *B60Q 1/06* (2013.01); *B62D 33/06* (2013.01); *G01S 19/42* (2013.01)

(58) Field of Classification Search
CPC ............................ B60Q 1/2611; B62D 33/06
See application file for complete search history.

(56) References Cited

U.S. PATENT DOCUMENTS

| 7,717,495 B2 * | 5/2010 | Leonard | B62D 61/10 296/183.1 |
| 8,913,566 B1 * | 12/2014 | Khanka | H04W 52/28 370/329 |
| 2021/0129747 A1 * | 5/2021 | Roeber | B60Q 1/46 |

FOREIGN PATENT DOCUMENTS

| EP | 2158799 A1 | 3/2010 |
| EP | 3092882 A1 | 11/2016 |
| JP | 2004161270 A * | 6/2004 |

* cited by examiner

*Primary Examiner* — Robert J May

(57) ABSTRACT

Systems, methods, and apparatuses for roadway illumination by an industrial vehicle are disclosed. A work light of the industrial vehicle is operated to provide illumination to an area located between a forward end of the industrial vehicle and an area illuminated by a low beam light. The work light and the low beam light are operated together to provide improved illumination during travel of the industrial vehicle along the roadway while promoting visibility of operators of oncoming vehicles.

24 Claims, 4 Drawing Sheets

LOW BEAM AND WORK LIGHT CONTROL FOR A WORK VEHICLE

FIELD OF THE DISCLOSURE

The present disclosure relates generally to vehicle lighting.

BACKGROUND OF THE DISCLOSURE

In the context of lighting, low beam lights are lights used by a vehicle during reduced ambient lighting conditions, such as at nighttime, to illuminate an area adjacent to the vehicle. Low light beams have a short-range focus. High beam lights are also lights used by a vehicle during reduced ambient lighting conditions. Generally, the high beam lights emit light that extend beyond the low beam lights. Thus, high beam lights illuminate an area beyond that illuminated by low beam lights. Low beam lights and high beam lights generally have a narrow beam spread. The narrow beam spread is used, for example, to project light into passing vehicles that may cause reduced visibility to operators of those vehicle. Work lights are lights used flood an area with light. For example, in an agricultural context, work lights are used to provide illumination an area around an agricultural vehicle, permitting agricultural operations to be performed during low ambient light conditions, such as at nighttime.

SUMMARY OF THE DISCLOSURE

An aspect of the present disclosure is directed to an industrial vehicle having lights for providing illumination to a roadway during travel therealong. The industrial vehicle may include an operator's compartment; a low beam light located at an upper portion of the operator's compartment, the low beam light providing illumination to first a location extending between a first position disposed a first distance beyond the industrial vehicle and a second position disposed a second distance beyond the industrial vehicle, the second distance being greater than the first distance; and a work light located at the upper portion of the operator's compartment, the work light providing illumination to a second location between an end of the industrial vehicle and the first position, the work light being automatically activated with the low beam light.

Another aspect is directed to a method of providing near field illumination for an industrial vehicle during movement along a roadway. The method may include providing a low beam light at an upper portion of an operator's compartment of an industrial vehicle. The low beam light may provide illumination to a first location between a first position disposed a first distance beyond the industrial vehicle and a second position disposed a second distance beyond the industrial vehicle, the second distance greater than the first distance. The method may also include providing a work light at the upper portion of the operator's compartment of the industrial vehicle, the work light providing illumination at second location disposed between an end of the industrial vehicle and the first position and activating the work light upon activation of the low beam light to provide illumination of the first location and the second location during movement of the industrial vehicle along a roadway.

A further aspect of the present disclosure is directed to a lighting fixture that may include a low beam light and a work light positioned adjacent to the low beam light, the low beam light and the work light being coupled such that the low beam light and the work light activate simultaneously.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
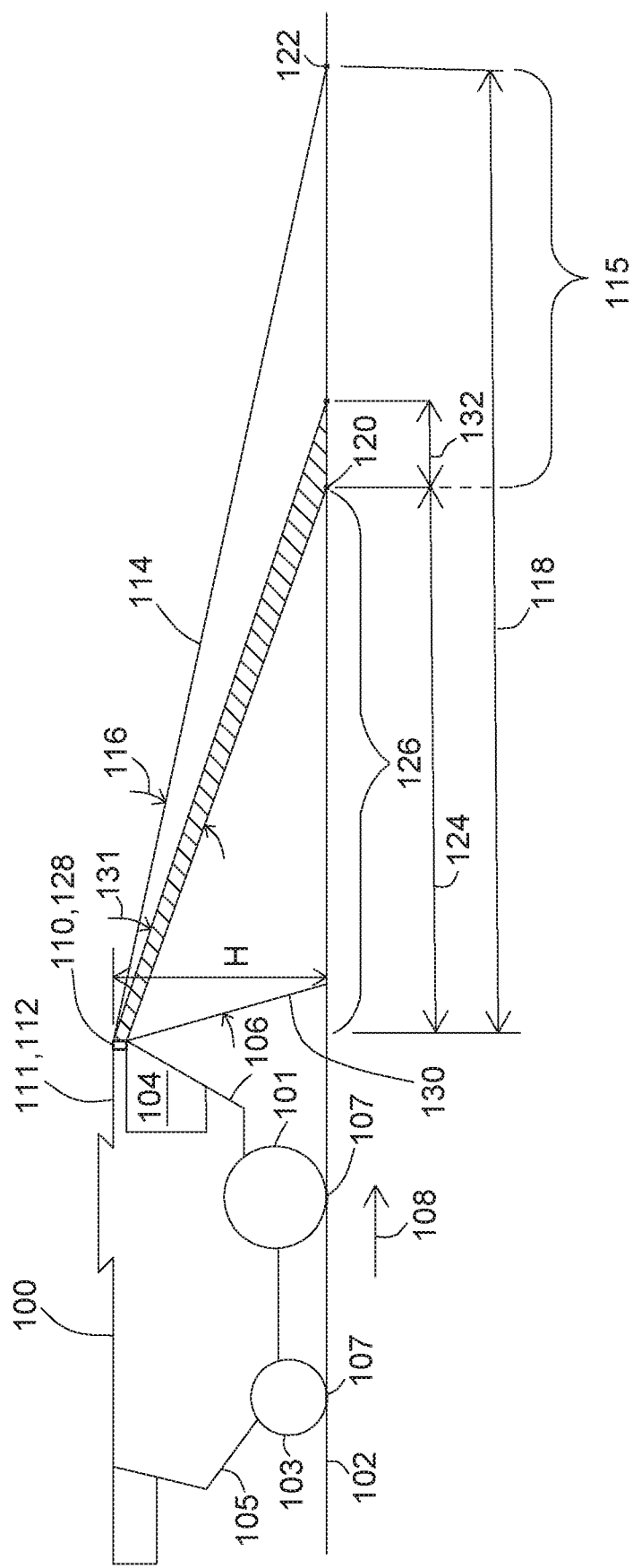
FIG. 1 is a side view of an agricultural vehicle located on a surface, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems, methods, and apparatuses for providing near-field illumination for a vehicle traveling along a roadway and, particularly, to near-field illumination for industrial vehicles. Low beam lights are generally used to illuminate an area adjacent to a vehicle during travel along a roadway during reduced ambient light conditions. Additionally, low beam lights are configured to generate a light beam that reduces an amount of light directed towards drivers of oncoming vehicles. As a result, illumination provided by low beam lights decreases irritation to the drivers of oncoming vehicles and, therefore, increases safety.

Configurations of the forward or leading end of industrial vehicles, such as combine harvesters and cotton harvesters, pose difficulties in providing effective illumination by lights located at a vertically lower position relative to a surface, e.g., a roadway, than lights disposed at a greater vertical distance from the surface. This is particularly true for low beam illumination due to the narrow angular spread of the low beam illumination, which is generally between 8° to 10°. The angular spread may be considered in the context of a cone of illumination emitted from a light source. For example, in the context of harvesters, a header attached at the front end of the harvester interferes with illumination provided by lights located closer to the surface than lights located a greater vertical distance from the surface. As a result, the illumination provided by lights having a vertically lower position has reduced effectiveness for illuminating the surface and, therefore, reduced effectiveness in provided useful illumination during travel of the vehicle along a roadway during reduced ambient light conditions.

FIG. 1 is a side view of an agricultural vehicle 100 located on a surface 102. The vehicle 100 includes an operator's compartment 104 disposed at a forward end 106 of the vehicle 100, first traction components 101 located adjacent to the forward end 106, and second traction components 103 located adjacent to a trailing end 105. The first traction components 101 and the traction components 103 include wheels, tracks, or other devices used to drive or steer or both drive and steer the vehicle 100 along the surface 102. The traction components 101 and 103 engage the surface 102 at a contact patch 107 thereof. A direction of forward movement is indicated by arrow 108. The vehicle 100 also includes a low beam light 110 located proximate to an upper portion 111 of the operator's compartment 104. In some implementations, the low beam light 110 may be coupled a roof 112 of the operator's compartment. For example, the low beam light 110 may be coupled to a side of the roof 112, as shown, for example, in FIG. 2. In some implementations, a vertical height H of the low beam light 110 (or other lights located along the forward end 106 of an industrial vehicle, such as a harvester), measured from the surface 102, may be between 9.8 feet (ft) (3.0 meters (m)) and 13.1 ft (4.0 m). In other implementations, the vertical height H of the low beam light 110 located on the forward end of the vehicle 100 may be greater than or less than the indicated range.

In order to reduce light introduced into the eyes of drivers of oncoming vehicles, illumination 114 produced by low beam lights 110 has a defined angular spread. For example, in some implementations, the low beam lights 110 may produce a cone of illumination 114 having an angular spread 116 of approximately 6° to 12° and, particularly, 8° to 10°. Additionally, low beam lights 110 are also configured so that illumination 114 produced by the low beam lights 110 does not extend beyond a first distance 118 extending beyond the forward end 106 of the vehicle 100, particularly beyond a location where the low beam light 110 is located. As shown in FIG. 1, an area 115 of the surface 102 illuminated by the illumination 114 extends from a first position 120 to a second position 122 that corresponds with an end of the first distance 118. The first position 120 is located a second distance 124 from the forward end 106 of the vehicle 100 where the low beam light 110 is located. In some implementations, the first distance 118 may be 98.4 ft (30 m). In other implementations, the first distance 118 may be greater than or less than 98.4 ft (30 m). In some implementations, the second distance 124 may be within a range of 16.4 ft (5.0 m) to 23.0 ft (7.0 m). However, the second distance 124 may vary based on a location of the second position 122, a height that the low beam light 110 is located above the surface 102, and an angular spread of the illumination 114. Thus, in some implementations, the second distance 124 may be greater than or less than the indicated range. The angular spread 116 of the illumination 114 and the first distance 118 beyond which the illumination 114 is prevented from extending may be defined for the purpose of reducing light applied to oncoming vehicles. In some implementations, legal requirements may define the angular spread 116 and the first distance 118.

As a result of the defined angular spread 116 of the illumination 114 produced by low beam light 110, the first distance 118 beyond which the illumination is prevented from passing, and the vertical height H at which the low beam light 110 is located above the surface 102, an area 126 of the surface 102 adjacent to the forward end 106 of the vehicle 100 is without illumination. Thus, during nighttime travel of the vehicle 100 along a roadway, an area immediately preceding the vehicle 100 is dark, limiting the operator's visibility of this area.

Because placing lights closer to the surface 102 is problematic, as described earlier, a work light 128 disposed adjacent to the low beam light 110 is used to provide illumination 130. The work light 128 produces illumination to flood an area with light, providing improved visibility of an operator during reduced ambient light level conditions, particularly at nighttime. The vehicle 100 may include a plurality of work lights, with each work light or group of work lights providing illumination to different regions near the vehicle. For example, in some implementations, one or more of the work lights may provide illumination to a region extending from the vehicle to a first location positioned at a selected distance from the vehicle while another work light or group of work lights may provide illumination to a second region. The second region may extend from the first location outwardly from the vehicle to a second location. In some implementations, additional work lights may provide illumination to other regions. In some implementations, adjacent regions may overlap. Thus, in some implementations, a portion of illumination from a work light or group of work lights used to illuminate one region may overlap illumination from another work light or group of work lights used to illuminate another region. In some implementations, illumination from one or more work lights used to illuminate one region may not overlap illumination from another work light or group of work lights used to illuminate an adjacent region.

In some implementations, the illumination 130 may be in the form of a cone that has an angular spread 131 of approximately 45°. In other implementations, the angular spread 131 may be greater than 45° or less than 45°. Because the area 126 to which the illumination 130 is directed is directly adjacent to the vehicle 100, the increased angular spread 131, compared to the angular spread 116 of the low beam illumination 114, has a reduced impact on operators of oncoming vehicles. At the surface 102, an amount of lateral spread of the illumination 130 is less invasive to an adjacent lane of traffic along a roadway due to the vicinity of the area 126 adjacent to the vehicle 100. As a result, the illumination 130 provides improved visibility of the area 126 to the operator of the vehicle 100 while also maintaining satisfactory visibility for operators of oncoming vehicles along a roadway.

The illumination 130 may illuminate all or a portion of the area 126. In the illustrated example, the illumination 130 overlaps the illumination 114 at an area 132. In some implementations, a length of the area 132 extending in the direction of arrow 108 may be approximately 16.4 ft (5.0 m). In other implementations, the length of the overlapping area 132 may be greater than or less than 16.4 ft (5.0 m). In some implementations, the illumination 114 and the illumination 130 may not overlap. In those cases where the illumination 130 overlaps the illumination 114, the illumination 130 may not extend beyond the second position 122.

Figure 2:
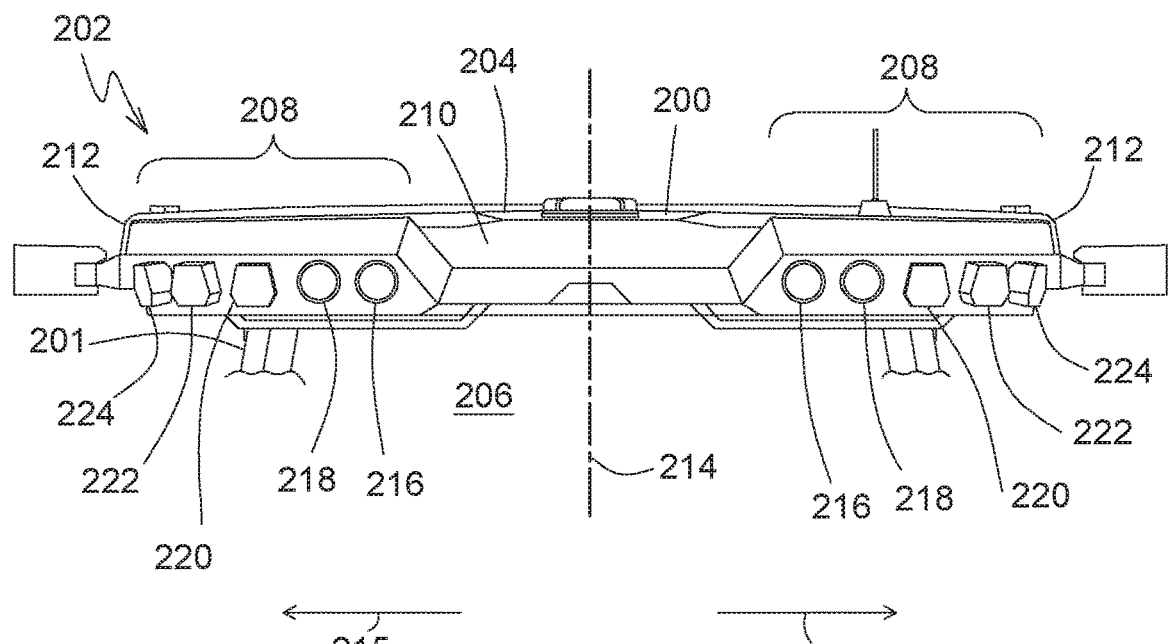
FIG. 2 is a detail view of an upper portion of a forward end of a vehicle, according to some implementations of the present disclosure.

FIG. 2 is a detail view of an upper portion 200 of an operator's compartment 206 located at a forward end 201 of an example vehicle 202. In some implementations, the vehicle 202 may be an agricultural vehicle, construction vehicle, forestry vehicle, or other type of industrial vehicle. The vehicle 202 may be similar to the vehicle 100. A plurality of light sources 208 are arranged horizontally along the forward end 200 and, in this example implementation, are coupled to a side 210 of the roof 204. The light sources 208 are arranged in two groups that wrap around corners 212 of the upper portion 200. The two groups of light sources 208 are symmetrically arranged about a centerline 214 of the vehicle 202.

In other implementations, the light sources 208 may be disposed in other locations. For example, in some implementations, one or more of the lights may be located below the side 210 of the roof 204 or extend from a top surface 212 of the roof 204. In other implementations, the light sources 208 may be asymmetrically arranged about the centerline 214 of the vehicle 202. Moreover, the light sources 208 may have other arrangement and remain within the scope of the present disclosure.

As shown in FIG. 2, the light sources 208 are horizontally arranged, and, moving from inboard near the centerline 214 to outboard in the direction of arrow 215, the light sources 208 include high beam lights 216, low beam lights 218, first work lights 220, second work lights 222, and third work lights 224. Corresponding lights on opposite sides of the centerline 214 forms a set of lights. The high beam lights 218 provide illumination beyond the illumination provided by the low beam lights 218, which may be similar to the illumination 114 describe earlier. The low beam lights 218 may be similar to the low beam lights 110, described earlier. Outboard of the low beam lights 218 are the first work lights 220, which may be similar to the work lights 128 described earlier. The first work lights 220 are used to provide illumination to an area about the vehicle 202. For example, the first work lights 220 may provide illumination to a first region of an area adjacent to the vehicle 202 during an operation, such as an agricultural operation being performed at nighttime. The first work lights 220 are also used in combination with the low beam lights 218 to provide illumination during reduced ambient light conditions, e.g., nighttime, when the vehicle 202 is traveling along a roadway, as explained above. When used in this way, the first work lights 220 provide illumination to an area extending from the forward end 201 that is unreached by illumination provided by the low beam lights 218.

The second work lights 222 provide illumination to another region of an area around the vehicle 202 different from the region covered by illumination from the first work lights 220. In some implementations, illumination provided by the first work lights 220 and the second work lights 222 may overlap. The third work light 224 also provide illumination to a region of the area around the vehicle 202 that is different from the regions covered by the illumination from the first and second work lights 220 and 222. In some implementations, though, illumination from the third work lights 224 may overlap one or both of the illumination provided by the first work lights 220 and the second work lights 222.

Although the high beam lights 216 and the low beam lights 218 are located inboard of the work lights 220, 222, and 224, the light sources 208 may have different arrangements. For example, one or both of the low beam lights 216 and the high beam light 218 may be located outboard of one or more of the work lights 220, 222, and 224. In other implementations, one or both of the high beam lights 216 and the low beam lights 218 may be interspersed among the work lights 220, 222, or 224. Thus, other arrangements of the high beam lights 216, low beam lights 218, first work lights 220, second work lights 222, and third work lights 224 are within the scope of the present disclosure. Additionally, although three sets of work lights are illustrated, other implementations may include fewer or additional sets or fewer sets of work lights.

In some implementations, the light sources 208 may be integral to the vehicle 202. In other implementations, one or more of the light sources 208 may be added to the vehicle 202 to provide the illumination and functionality described herein. For example, the light sources 208 may be provided in the form of a kit or an assembly that is coupled to the vehicle 202. In some implementations, the low beam light 218 and the first work light 220 are coupled such that activation of the low beam light 218 automatically activates the first work light 220. For example, a lighting system of the vehicle 202 may have different settings, including a road mode, which may correspond to a setting used for when the vehicle 202 is traveling on a roadway, and a field mode, which may correspond to a setting used for when the vehicle 202 is operating in a field. When the road mode is selected, the lighting system automatically links the low beam light 218 and the first work light 220 to activate together upon receipt of an activation input, such as an input to activate the low beam light 218. An activation input may be an input from an operator, such as an operator's activation of the low beam light 218 or an input received from another source, such as a remotely located operator or a controller, such as controller 302, described in more detail below.

Figure 3:
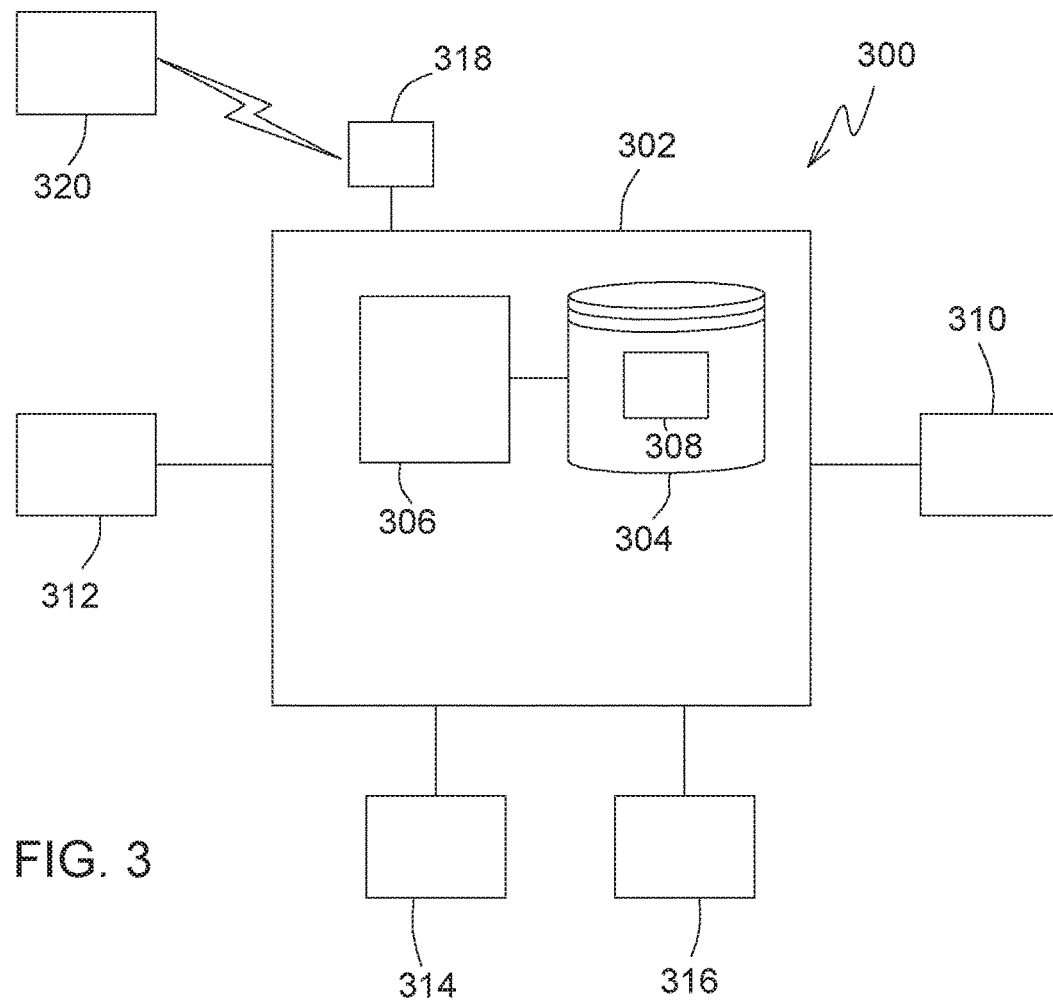
FIG. 3 is a schematic view of an example lighting system, according to some implementations of the present disclosure.

FIG. 3 is a schematic diagram an example lighting control system 300 that may be included in a vehicle, such as an agricultural vehicle, construction vehicle, forestry vehicle or other type of industrial vehicle. The following description of the system 300 is provided merely as an example. Other systems having other configurations are also within the scope of the present disclosure.

The system 300 includes a controller 302. In some implementations, the controller 302 is an electronic computer that operates to control various aspects of the system 300. The controller 302 includes a memory 304 and a processor 306. Although a single memory 304 and a single processor 306 are illustrated, in other implementations, a plurality of memories, a plurality of processors, or a plurality of both memories and processors may be used. The memory 304 is shown as being included in the controller 302, in some implementations, the memory 304 may be remotely located from the controller 302 and communicably coupled to the controller 302 via a wired or wireless connection. The memory 304 stores programs, such as application 308, and other information 309 (such as in the form of data) and communicates with the processor 306. Further, in some implementations, all or a portion of the processing may be performed remotely from the controller 302. For example, in some implementations, one or more processors 306 may be located remotely from the controller 302. The output from the remotely located processor or processors 306 may be transmitted to the system 300 to be operated accordingly.

The processor 306 is operable to execute programs and receive information from and send information to the memory 304. The processor 306 executes application 308. The application 308 may be stored on memory 304. In other implementations, the application 308 may be stored remotely from the system 300. The application 308 contains computer-readable instructions that, when executed by the processor 306, controls one or more operations of the system 300. Particularly, the program 308 may control activation of one or more lights and when the one or more lights are activated.

The system 300 includes a display 310 coupled to the controller 302. The display 310 may be used to present information to a user or, where the display includes a touch screen, the display 310 may be used as an input device. The display 310 may include a graphical user interface, described in more detail below, that allows a user to interface with applications executed by the processor 306. An input device 312 is also coupled to the controller 302. A user may use the input device 312 to input information into the controller 302.

The system 300 also includes a low beam light 314 and a work light 316 coupled to the controller 302. The low beam light 314 may be similar to the low beam lights 110 and 218. The work light 316 may be similar to the work lights 128 and 220. Thus, the work light 316 is operable to provide illumination to an area adjacent to a vehicle not covered by illumination provided by the low beam light 314. The system 300 may include additional lights, such as other work lights. The system 300 includes or is coupled to a receiver 318 that is operable to receive information from a positioning system 320. In some implementations, the positioning system 320 is a global positioning system (GPS) and the receiver 318 is a GPS receiver.

In operation, the system 300 receives one or more signals from the positioning system 320 via the receiver 318. The system 300 uses the received signal or signals to determine a position of the system 300 (and, hence, a vehicle to which the system 300 is coupled) on the earth. The memory 304 may include map data that include data representative of roadways within one or more regions on the earth. Using the determined position information, the controller 302 determines whether system 300 (and vehicle) are located on a roadway using the map data. In some implementations, if the determined position corresponds with a location along a roadway and a user activates the low beam lights 314, the controller 300 simultaneously activates the work light 316 to provide illumination for travel of the vehicle along the roadway.

In other implementations, the system 300 may also determine ambient lighting conditions using, for example, a light sensor or using the time of day. For example, a reduced ambient light condition may exist when a sensed level of illumination is below a selected threshold illumination level. When the system 300 determines reduced ambient light conditions exist and determines that the vehicle containing the system 300 is on a roadway, the system 300 may automatically activate both the low beam light 314 and the work light 316 simultaneously to provide illumination as the vehicle travels along a roadway. In other implementations, if reduced ambient light conditions exist and the vehicle is determined to be on a roadway, the system 300 simultaneously activates both the low beam light 314 and the work light 316 when a user activates the low beam light 314.

Figure 4:
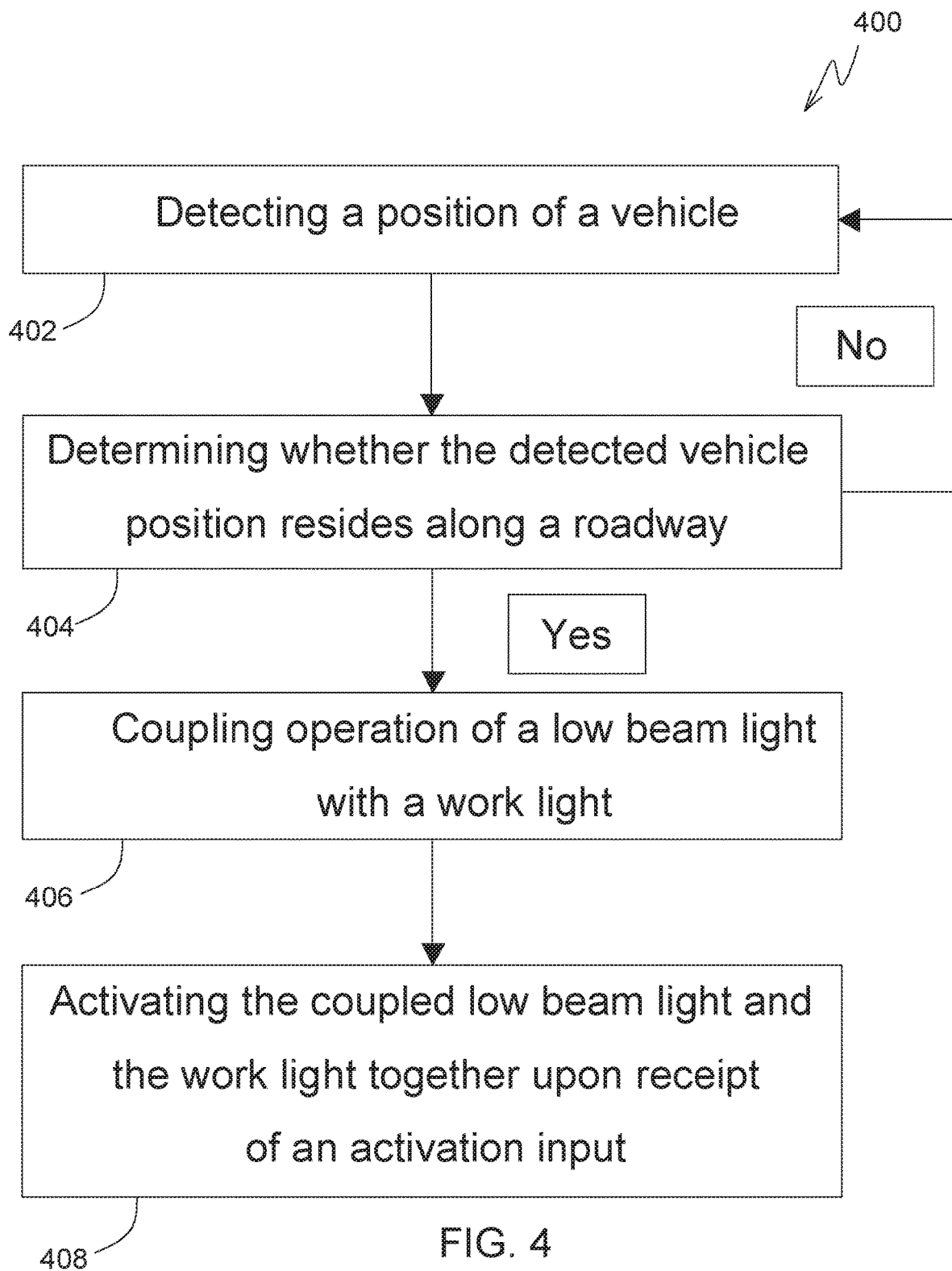
FIG. 4 is a flowchart of an example method for providing illumination from a low beam light and a work light of a vehicle during travel along a roadway, according to some implementations of the present disclosure.

FIG. 4 is a flowchart of an example method 400 for providing illumination from a low beam light and a work light of a vehicle during travel along a roadway. At 402, Operation of the system 300 is described in the context of the example method 400 of FIG. 4. At 402, a position of a vehicle is detected. The position may be detected by using a positioning system, such as a GPS. At 404, a determination is made as to whether the vehicle is positioned along a roadway using the determined position of the vehicle. In some implementations, the vehicle may be determined as being positioned along a roadway by comparing the determined position of the vehicle to map data, which includes roadway information. If the vehicle is determined to be along a roadway, the method 400 proceeds to 406. If the vehicle is not determined to be along a roadway, the method 400 returns to 402.

At 406, a work light configured to provide illumination to an area adjacent to the vehicle not illuminated by a low beam light is operationally coupled to the low beam light. At 408, the coupled low beam light and work light are activated together upon receipt of an activation input. In some implementations, simultaneous activation of the low beam light and work light occurs automatically upon detection of reduced ambient light conditions. In some implementations, reduced ambient light conditions may be detected using a light sensor. In other implementations, whether low ambient light conditions exist may be determined based on time of day. However, the scope of the present disclosure encompasses detection of reduced ambient light conduit in other ways. In other implementations, simultaneous activation of the low beam light and the work light when low ambient light conditions are detected occurs when a user activates the low beam light.

Figure 5:
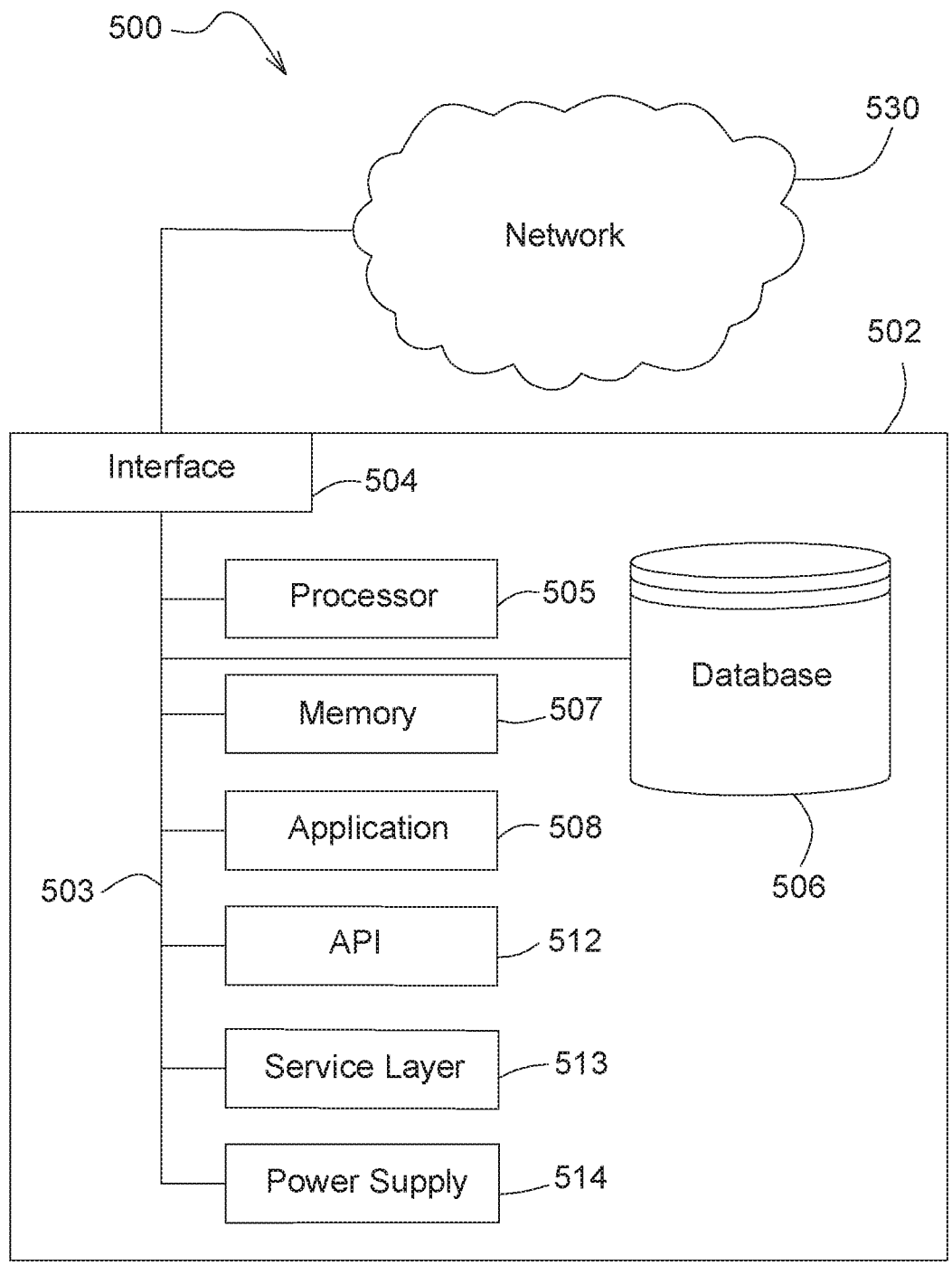
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes providing a low beam light at an upper portion of an operator's compartment of an industrial vehicle, the low beam light providing illumination to a first location between a first position disposed a first distance beyond the industrial vehicle and a second position disposed a second distance beyond the industrial vehicle, the second distance greater than the first distance; providing a work light at the upper portion of the operator's compartment of the industrial vehicle, the work light providing illumination at second location disposed between an end of the industrial vehicle and the first position; and activating the work light upon activation of the low beam light to provide illumination of the first location and the second location during movement of the industrial vehicle along a roadway.

The foregoing and other described implementations can each, optionally, include one or more of the following features:

A first feature, combinable with any of the following features, the method further including detecting whether the industrial vehicle is on the roadway, wherein activating the work light upon activation of the low beam light for providing illumination of the first location and the second location during movement of the industrial vehicle along a roadway comprises automatically activating the work light and the low beam light when the industrial vehicle is detected along the roadway.

A second feature, combinable with any of the previous or following features, wherein detecting whether the industrial vehicle is on the roadway includes: detecting a position of the industrial vehicle using a positioning system; and determining that the industrial vehicle is on the roadway when the detected position of the industrial vehicle corresponds to a location along a roadway.

A third feature, combinable with any of the previous or following features, wherein the positioning system is a global positioning system.

A fourth feature, combinable with any of the previous or following features, wherein the low-beam light is vertically positioned between (9.8 feet (ft) (3.0 meters (m)) and 13.1 ft (4.0 m) from the roadway.

A fifth feature, combinable with any of the previous or following features, wherein the work light is vertically positioned between (9.8 feet (ft) (3.0 meters (m)) and 13.1 ft (4.0 m) from the roadway.

A sixth feature, combinable with any of the previous or following features, wherein the second distance is 98.4 feet (ft) (30.0 meters (m)).

A seventh feature, combinable with any of the previous or following features, wherein a lateral angular spread of the illumination provided by the low beam light is approximately 8°.

An eighth feature, combinable with any of the previous features, wherein the operator's compartment comprises a roof at the upper portion of the operator's compartment, and wherein the work light and the low beam light are coupled to a side of the roof.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a GPS receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Without in any way limiting the scope, interpretation, or application of the claims appearing below, a technical effect of one or more of the example implementations disclosed herein is reducing or eliminating one or more areas adjacent to a vehicle that lack illumination by low beam lights with the use of illumination from one or more other light sources while maintaining an amount of light directed towards drivers of oncoming vehicles at satisfactory levels. Another technical effect of one or more of the example implementations disclosed herein is providing illumination to an area adjacent a vehicle during travel along a roadway that is not obstructed by an implement coupled to the vehicle.

Words of orientation, such as "up," "down," "top," "bottom," "above," "below," "leading," "trailing," "front," "back," "forward," and "rearward" are used in the context of the illustrated examples as would be understood by one skilled in the art and are not intended to be limiting to the disclosure. For example, for a particular type of vehicle in a conventional configuration and orientation, one skilled in the art would understand these terms as the terms apply to the particular vehicle.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. An industrial vehicle having lights for providing illumination to a roadway during travel therealong, the industrial vehicle comprising:
   an operator's compartment;
   a low beam light located at an upper portion of the operator's compartment, the low beam light providing illumination to first a location extending between a first position disposed a first distance beyond the industrial vehicle and a second position disposed a second distance beyond the industrial vehicle, the second distance being greater than the first distance; and
   a work light located at the upper portion of the operator's compartment, the work light providing illumination to a second location between an end of the industrial vehicle and the first position, the work light being automatically activated with the low beam light.

2. The industrial vehicle of claim 1, further comprising a traction component, wherein low beam light is vertically disposed at least 9.8 feet (ft) (3.0 meters (m)) from a contact patch of the traction component, the contact patch configured to engage the roadway.

3. The industrial vehicle of claim 1, further comprising a traction component, wherein work light is vertically disposed at least 9.8 feet (ft) (3.0 meters (m)) from a contact patch of the traction component, the contact patch configured to engage the roadway.

4. The industrial vehicle of claim 1, further comprising a traction component, wherein the low-beam light is vertically disposed between (9.8 feet (ft) (3.0 meters (m)) and 13.1 ft (4.0 m) from a contact patch of the traction component, the contact patch configured to engage the roadway.

5. The industrial vehicle of claim 1, further comprising a traction component, wherein the work light is vertically disposed between (9.8 feet (ft) (3.0 meters (m)) and 13.1 ft (4.0 m) from a contact patch of the traction component, the contact patch configured to engage the roadway.

6. The industrial vehicle of claim 1, further comprising a positioning system that detects a position of the industrial vehicle on the earth, and wherein the work light and the low beam light are automatically activated when the industrial vehicle is detected on a roadway using the positioning system.

7. The industrial vehicle of claim 6, wherein the positioning system is a global positioning system.

8. The industrial vehicle of claim 1, wherein the second distance is 98.4 feet (ft) (30.0 meters (m)).

9. The industrial vehicle of claim 1, wherein a lateral angular spread of the illumination provided by the low beam light is approximately 8°.

10. The industrial vehicle of claim 1, wherein a lateral angular spread of illumination provided by the work light is approximately 45°.

11. The industrial vehicle of claim 1, wherein the operator's compartment comprises a roof at the top of the operator's compartment, and wherein the work light is coupled to a side of the roof.

12. A method of providing near field illumination for an industrial vehicle during movement along a roadway, the method comprising:
   providing a low beam light at an upper portion of an operator's compartment of an industrial vehicle, the low beam light providing illumination to a first location between a first position disposed a first distance beyond the industrial vehicle and a second position disposed a second distance beyond the industrial vehicle, the second distance greater than the first distance;
   providing a work light at the upper portion of the operator's compartment of the industrial vehicle, the work light providing illumination at second location disposed between an end of the industrial vehicle and the first position; and activating the work light upon activation of the low beam light to provide illumination of the first location and the second location during movement of the industrial vehicle along a roadway.

13. The method of claim 12, further comprising detecting whether the industrial vehicle is on the roadway, and
wherein activating the work light upon activation of the low beam light for providing illumination of the first location and the second location during movement of the industrial vehicle along a roadway comprises automatically activating the work light and the low beam light when the industrial vehicle is detected along the roadway.

14. The method of claim 13, wherein detecting whether the industrial vehicle is on the roadway comprises:
detecting a position of the industrial vehicle using a positioning system; and
determining that the industrial vehicle is on the roadway when the detected position of the industrial vehicle corresponds to a location along a roadway.

15. The method of claim 14, wherein the positioning system is a global positioning system.

16. The method of claim 12, wherein the low-beam light is vertically positioned between (9.8 feet (ft) (3.0 meters (m)) and 13.1 ft (4.0 m) from the roadway.

17. The method of claim 12, wherein the work light is vertically positioned between (9.8 feet (ft) (3.0 meters (m)) and 13.1 ft (4.0 m) from the roadway.

18. The method of claim 12, wherein the second distance is 98.4 feet (ft) (30.0 meters (m)).

19. The method of claim 12, wherein a lateral angular spread of the illumination provided by the low beam light is approximately 8°.

20. The method of claim 12, wherein the operator's compartment comprises a roof at the upper portion of the operator's compartment, and wherein the work light and the low beam light are coupled to a side of the roof.

21. A lighting fixture comprising:
a low beam light; and
a work light positioned adjacent to the low beam light, the low beam light and the work light coupled such that the low beam light and the work light activate simultaneously,
wherein the low beam light provides illumination to first a location between a first position disposed a first distance beyond the light fixture and a second position disposed a second distance beyond the light fixture, the second distance being greater than the first distance, and
wherein the work light provides illumination at a second location between an end of the light fixture and the first position.

22. The lighting fixture of claim 21, wherein the low beam light is located horizontally adjacent to the work light.

23. The lighting fixture of claim 21, wherein the low beam light comprises two low beam lights, wherein one of the low beam lights is located at a first end of the light fixture offset from a center of the light fixture, and wherein the second low beam light is provided on a second end of the light fixture, opposite the first side, the second light offset from the center.

24. The lighting fixture of claim of claim 23, wherein the work light comprises two work lights, wherein one of the work lights is located on the first end of the light fixture, outboard of the first low beam light, and wherein the second work light is located on the second end of the light fixture, outboard of the second low beam light.

* * * * *